United States Patent
Satou et al.

(10) Patent No.: US 7,302,928 B2
(45) Date of Patent: Dec. 4, 2007

(54) CONTROL APPARATUS FOR INTERNAL COMBUSTION ENGINE

(75) Inventors: Fumikazu Satou, Toyota (JP); Takuya Ikoma, Nishikamo-gun (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 145 days.

(21) Appl. No.: 11/268,516

(22) Filed: Nov. 8, 2005

(65) Prior Publication Data
US 2006/0096572 A1 May 11, 2006

(30) Foreign Application Priority Data
Nov. 11, 2004 (JP) .............................. 2004-328108

(51) Int. Cl.
*F02B 17/00* (2006.01)
(52) U.S. Cl. ................... 123/295; 123/299; 123/431
(58) Field of Classification Search ................ 123/295, 123/299, 430, 431
See application file for complete search history.

(56) References Cited

U.S. PATENT DOCUMENTS

| | | | |
|---|---|---|---|
| 6,314,940 B1* | 11/2001 | Frey et al. | 123/431 |
| 6,725,649 B2* | 4/2004 | Yamashita et al. | 60/284 |
| 6,725,827 B2* | 4/2004 | Ueda et al. | 123/295 |
| 6,988,485 B2* | 1/2006 | Ichise et al. | 123/430 |
| 7,216,626 B2* | 5/2007 | Araki et al. | 123/406.47 |

FOREIGN PATENT DOCUMENTS

| | | |
|---|---|---|
| DE | 198 53 799 A1 | 5/2000 |
| EP | 0 943 793 A2 | 9/1999 |
| JP | A 11-101146 | 4/1999 |
| JP | A 2001-020837 | 1/2001 |
| JP | A 2005-256675 | 9/2005 |

OTHER PUBLICATIONS

Dr. Günter Fraidl et al., "Gasoline Direct Injection An Integrated Systems Approach", Conference Engine and Environment, pp. 257-271, XP-000992233, 1997.
U.S. Appl. No. 11/184,993, filed Jul. 20, 2005, Sadakane et al.

* cited by examiner

*Primary Examiner*—Erick Solis
(74) *Attorney, Agent, or Firm*—Oliff & Berridge, PLC

(57) ABSTRACT

An engine ECU executes a program including the step of detecting an engine coolant temperature (THW), the step of selecting a map for a warm state as the map for calculating a fuel injection ratio (or a DI ratio) r when the engine coolant temperature (THW) is equal to or higher than a temperature threshold value (THW(TH)) (YES in S110), the step of selecting a map for a cold state as the map for calculating the fuel injection ratio (or the DI ratio) r when the engine coolant temperature (THW) is lower than the temperature threshold value (THW(TH)) (NO in S110), and the step of calculating the fuel injection ratio between the in-cylinder injector and the intake manifold injector (or the DI ratio) r based on the engine speed, load factor, and the selected map.

18 Claims, 4 Drawing Sheets

CONTROL APPARATUS FOR INTERNAL COMBUSTION ENGINE

This nonprovisional application is based on Japanese Patent Application No. 2004-328108 filed with the Japan Patent Office on Nov. 11, 2004, the entire contents of which are hereby incorporated by reference.

BACKGROUND OF THE INVENTION

1. Field of the Invention

The present invention relates to a control apparatus for an internal combustion engine having a first fuel injection mechanism (an in-cylinder injector) for injecting a fuel into a cylinder and a second fuel injection mechanism (an intake manifold injector) for injecting a fuel into an intake manifold or an intake port, and relates particularly to a technique for determining a fuel injection ratio between the first and second fuel injection mechanisms.

2. Description of the Background Art

An internal combustion engine having a first fuel injection valve (an intake manifold injector in the background art) for injecting a fuel into an intake manifold of the engine and a second fuel injection valve (an in-cylinder injector in the background art) for always injecting a fuel into a combustion chamber of the engine, and configured to stop fuel injection from the first fuel injection valve (the intake manifold injector) when the engine load is lower than a preset load and to cause fuel injection from the first fuel injection valve (the intake manifold injector) when the engine load is higher than the set load, is known.

In such an internal combustion engine, one configured to switch between stratified charge combustion and homogeneous combustion in accordance with its operation state is known. In the stratified charge combustion, the fuel is injected from the in-cylinder injector during a compression stroke to form a stratified air-fuel mixture locally around a spark plug, for lean combustion of the fuel. In the homogeneous combustion, the fuel is diffused in the combustion chamber to form a homogeneous air-fuel mixture, for combustion of the fuel.

Japanese Patent Laying-Open No. 2001-020837 discloses a fuel injection control apparatus for an engine that switches between stratified charge combustion and homogeneous combustion in accordance with an operation state and that has a main fuel injection valve for injecting a fuel directly into a combustion chamber and a secondary fuel injection valve for injecting a fuel into an intake port of each cylinder. This fuel injection control apparatus for the engine is characterized in that the fuel injection ratio between the main fuel injection valve and the secondary fuel injection valve is set in a variable manner based on an operation state of the engine.

According to this fuel injection control apparatus for the engine, the stratified charge combustion is carried out using only the main fuel injection valve directly injecting the fuel into the combustion chamber, while the homogeneous combustion is carried out using both the main fuel injection valve and the secondary fuel injection valve (or using only the secondary fuel injection valve in some cases). This can keep the capacity of the main fuel injection valve small, even in the case of an engine of high power. Linearity in injection duration/injection quantity characteristic of the main fuel injection valve in a low-load region such as during idling is improved, which in turn improves accuracy in control of the fuel injection quantity. Accordingly, it is possible to maintain favorable stratified charge combustion, and thus to improve stability of the low-load operation such as idling. In the homogeneous combustion, both the main and secondary fuel injection valves are employed, so that the benefit of the direct fuel injection and the benefit of the intake port injection are both enjoyed. Accordingly, favorable homogeneous combustion can also be maintained.

In the fuel injection control apparatus for the engine disclosed in Japanese Patent Laying-Open No. 2001-020837, the stratified charge combustion and the homogeneous combustion are employed according to the situations, which complicates ignition control, injection control and throttle control, and requires control programs corresponding to the respective combustion manners. Particularly, upon switching between the combustion manners, these controls require considerable changes, making it difficult to realize desirable controls (of fuel efficiency, emission purification performance) at the time of transition. Further, in the stratified combustion region where lean combustion is carried out, the three-way catalyst does not work, in which case a lean NOx catalyst needs to be used, leading to an increased cost.

Based on the foregoing, a direct injection engine has been developed which has only an in-cylinder injector to carry out homogeneous combustion over the entire region, with no stratified charge combustion conducted, and thus does not need control for switching between the stratified charge combustion and the homogeneous combustion and does not require an expensive lean NOx catalyst.

In such a direct injection engine, however, the homogeneous combustion is carried out over the entire region using only the in-cylinder injector. This may lead to insufficient homogeneity and large torque fluctuations in the low-speed and high-load state of the engine. Japanese Patent Laying-Open No. 2001-020837 described above merely discloses that in the region where homogeneous combustion is carried out, a ratio of the quantity of the fuel injected from the secondary fuel injection valve injecting the fuel into the intake port with respect to the total quantity of the fuel injected is increased in accordance with an increase of the engine output (engine speed and load), which cannot provide solutions to the above-described problems.

SUMMARY OF THE INVENTION

An object of the present invention is to provide a control apparatus for an internal combustion engine conducting fuel injection using one or both of a first fuel injection mechanism for injecting a fuel into a cylinder and a second fuel injection mechanism for injecting a fuel into an intake manifold, capable of solving the problem associated with a combination of stratified charge combustion and homogeneous combustion, and also capable of solving the problem associated with homogeneous combustion in the case of a direct injection engine.

A control apparatus according to the present invention controls an internal combustion engine having a first fuel injection mechanism for injecting a fuel into a cylinder and a second fuel injection mechanism for injecting a fuel into an intake manifold. The control apparatus includes a determination unit for determining whether the internal combustion engine is in a normal operation state, and a control unit for controlling the first and second fuel injection mechanisms based on information associated with an operation state of the internal combustion engine such that homogeneous combustion solely is carried out when it is determined that the internal combustion engine is in the normal operation state. The information indicates that the first fuel injection mechanism has a fuel injection ratio increased as the engine's speed shifts to a predetermined high range.

According to this invention, when the first fuel injection mechanism (for example, an in-cylinder injector) and the second fuel injection mechanism (for example, an intake manifold injector) are both used for fuel injection, the fuel injection ratio between the in-cylinder injector and the intake manifold injector is controlled based on an operation state of the internal combustion engine (determined, e.g., by the engine speed and the load thereof) that is set separately for the warm state and the cold state of the internal combustion engine, for example. This can realize homogeneous combustion over the entire region, so that the conventional problem is solved. It is noted that an example of an operation state other than the normal operation state may be a catalyst warm-up operation during idling. In particular, in the low-speed and high-load region, mixing of an air-fuel mixture formed by the fuel injected from the in-cylinder injector is poor, and such inhomogeneous air-fuel mixture within the combustion chamber may lead to unstable combustion. Accordingly in the present invention the fuel injection ratio of the in-cylinder injector is increased as the engine speed increases where such a problem is unlikely to occur. As a result, it is possible to provide a control apparatus for an internal combustion engine where fuel injection is carried out using one or both of the first fuel injection mechanism for injecting the fuel into the cylinder and the second fuel injection mechanism for injecting the fuel into the intake manifold, which can solve the problem associated with the combination of the stratified charge combustion and the homogeneous combustion as well as the problem associated with the homogeneous combustion in the case of a direct injection engine. It is noted that the present invention is generally equivalent to decreasing the fuel injection ratio of the first fuel injection mechanism as the state of the engine moves toward a predetermined low speed region.

Preferably, the information is set such that control regions of the first and second fuel injection mechanisms change as a temperature of the internal combustion engine changes. In this case, the control apparatus further includes a detection unit for detecting the temperature of the internal combustion engine, and the control unit controls the fuel injection mechanisms based on the detected temperature and the information.

According to this invention, the fuel injection ratio between the in-cylinder injector and the intake manifold injector is set based on the temperature of the internal combustion engine (separately for the warm state and the cold state of the internal combustion engine, for example), or the fuel injection ratio therebetween is set using the temperature of the internal combustion engine as a parameter. Thus, by making the regions of the fuel supply injectors of different characteristics variable in accordance with the temperature of the internal combustion engine, it is possible to provide a control apparatus for an internal combustion engine of high performance having dual injectors.

More preferably, the information is set such that the control region of the second fuel injection mechanism is expanded to include a region of higher engine speed as the temperature of the internal combustion engine is lower.

According to this invention, accumulation of deposits in the in-cylinder injector is further restricted as the temperature of the internal combustion engine is lower. It is thus possible to secure a large injection region for the intake manifold injector (including the region where both the intake manifold injector and the in-cylinder injector are used), which can improve homogeneity of the air-fuel mixture.

More preferably, the information indicates that the first fuel injection mechanism has a fuel injection ratio decreased as the engine's load shifts to a predetermined high range.

According to the present invention, in the low-speed and high-load region, mixing of an air-fuel mixture formed by the fuel injected from the in-cylinder injector is poor, and such inhomogeneous air-fuel mixture within the combustion chamber may lead to unstable combustion. Accordingly in the present invention the fuel injection ratio of the in-cylinder injector is decreased as the engine's load shifts to a high-load region where such a problem occurs. This can reduce the variation of a torque output from the engine that is attributed to unstable combustion. Note that the present invention is generally equivalent to increasing the fuel injection ratio of the first fuel injection mechanism as the engine's load shifts to a predetermined low-load region.

More preferably, the determination unit determines that the internal combustion engine is in an abnormal operation state during a catalyst warm-up operation upon idling. Then, the control unit further includes an abnormal operation state controller controlling the first fuel injection mechanism to carry out stratified charge combustion in the abnormal operation state.

According to this invention, during the catalyst warm-up operation identified as the abnormal operation state, warming up of the catalyst is promoted with the stratified charge combustion, while homogeneous combustion is carried out in the remaining, normal operation states (both in the warm state and the cold state of the internal combustion engine). This prevents the control from being complicated.

As used herein, the stratified charge combustion includes both the stratified charge combustion and semi-stratified charge combustion. In the semi-stratified charge combustion, an intake manifold injector injects fuel in the intake stroke to generate a lean and homogeneous air-fuel mixture in the whole combustion chamber, and then an in-cylinder injector injects fuel in the compression stroke to generate a rich air-fuel mixture around the spark plug, so as to improve the combustion state. Such semi-stratified charge combustion is preferable in the catalyst warm-up operation for the following reasons. In the catalyst warm-up operation, it is necessary to considerably retard the ignition timing and maintain a good combustion state (idling state) so as to cause a high-temperature combustion gas to reach the catalyst. Further, a certain quantity of fuel needs to be supplied. If the stratified charge combustion is employed to satisfy these requirements, the quantity of the fuel will be insufficient. With the homogeneous combustion, the retarded amount for the purpose of maintaining a good combustion state is small compared to the case of stratified charge combustion. For these reasons, the above-described semi-stratified charge combustion is preferably employed in the catalyst warm-up operation, although either of stratified charge combustion and semi-stratified charge combustion may be employed.

More preferably, the information is set such that the first fuel injection mechanism alone is used in a predetermined, low engine load region when a temperature of the internal combustion engine is high.

In the warm state of the internal combustion engine, the temperature at the injection hole of the in-cylinder injector is high, and deposits are likely to accumulate in the injection hole. According to the invention, however, injecting the fuel using the in-cylinder injector can lower the temperature at the injection hole, thereby preventing accumulation of the deposits therein. Further, the minimum fuel injection quantity of the in-cylinder injection can be guaranteed while preventing clogging of the in-cylinder injector. Accordingly, homogeneous combustion is realized in the relevant region using the in-cylinder injector.

More preferably, the information is set such that the second fuel injection mechanism alone is used in a predetermined, low engine load region when the temperature of the internal combustion engine is low.

In the cold state of the internal combustion engine, if its load is low, the quantity of the intake air is small, and the fuel is unlikely to be atomized. In such a region, it is difficult to ensure good combustion with the fuel injection using the in-cylinder injector. Further, particularly in the low-load and low-speed region, high output using the in-cylinder injector is unnecessary. Therefore, according to the invention, instead of the in-cylinder injector, the intake manifold injector solely is used for fuel injection in the relevant region, which can improve the homogeneity of the air-fuel mixture.

More preferably, the information includes information indicating a fuel injection ratio between the first and second fuel injection mechanisms that is defined by the engine speed and the load factor of the internal combustion engine.

According to this invention, the fuel injection ratio between the in-cylinder injector and the intake manifold injector is determined based on the engine speed and the load factor of the internal combustion engine, and in a normal operation state, homogeneous combustion is realized with any engine speed and any load factor.

More preferably, the first fuel injection mechanism is an in-cylinder injector, and the second fuel injection mechanism is an intake manifold injector.

According to this invention, it is possible to provide a control apparatus for the internal combustion engine in which fuel injection is carried out using the in-cylinder injector as the first fuel injection mechanism and the intake manifold injector as the second fuel injection mechanism that are separately provided, capable of solving the problem associated with the combination of the stratified charge combustion and the homogeneous combustion as well as the problem associated with the homogeneous combustion in the case of a direct injection engine.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
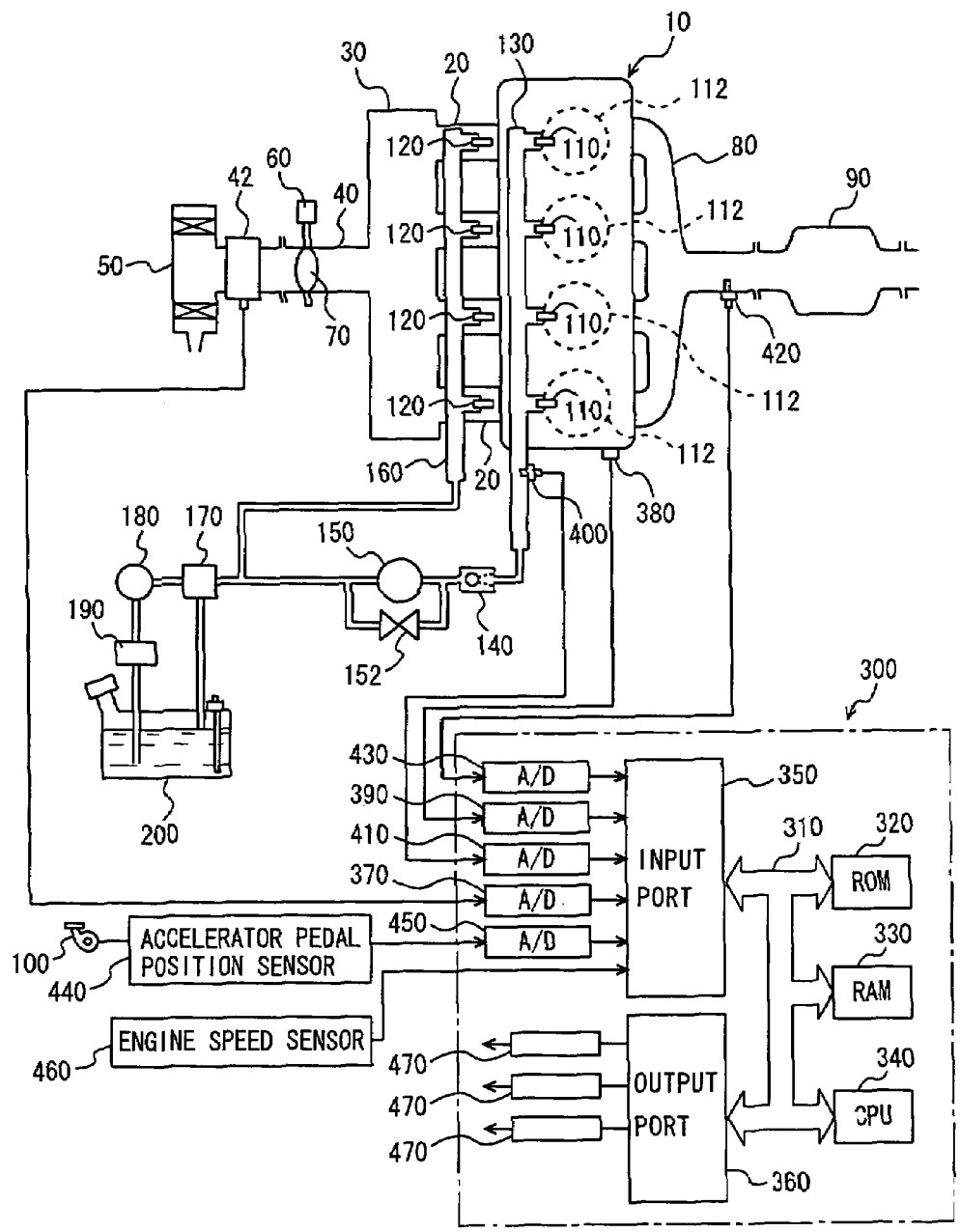
FIG. 1 is a schematic configuration diagram of an engine system controlled by a control apparatus according to an embodiment of the present invention.

Hereinafter, embodiments of the present invention will be described with reference to the drawings. In the following description, the same parts have the same reference characters allotted and also have the same names and functions. Thus, detailed description thereof will not be repeated.

FIG. 1 is a schematic configuration diagram of an engine system that is controlled by an engine ECU (Electronic Control Unit) implementing the control apparatus for an internal combustion engine according to an embodiment of the present invention. In FIG. 1, an in-line 4-cylinder gasoline engine is shown, although the application of the present invention is not restricted to such an engine.

As shown in FIG. 1, the engine 10 includes four cylinders 112, each connected via a corresponding intake manifold 20 to a common surge tank 30. Surge tank 30 is connected via an intake duct 40 to an air cleaner 50. An airflow meter 42 is arranged in intake duct 40, and a throttle valve 70 driven by an electric motor 60 is also arranged in intake duct 40. Throttle valve 70 has its degree of opening controlled based on an output signal of an engine ECU 300, independently from an accelerator pedal 100. Each cylinder 112 is connected to a common exhaust manifold 80, which is connected to a three-way catalytic converter 90.

Each cylinder 112 is provided with an in-cylinder injector 110 for injecting fuel into the cylinder and an intake manifold injector 120 for injecting fuel into an intake port or/and an intake manifold. Injectors 110 and 120 are controlled based on output signals from engine ECU 300. Further, in-cylinder injector 110 of each cylinder is connected to a common fuel delivery pipe 130. Fuel delivery pipe 130 is connected to a high-pressure fuel pump 150 of an engine-driven type, via a check valve 140 that allows a flow in the direction toward fuel delivery pipe 130. In the present embodiment, an internal combustion engine having two injectors separately provided is explained, although the present invention is not restricted to such an internal combustion engine. For example, the internal combustion engine may have one injector that can effect both in-cylinder injection and intake manifold injection.

As shown in FIG. 1, the discharge side of high-pressure fuel pump 150 is connected via an electromagnetic spill valve 152 to the intake side of high-pressure fuel pump 150. As the degree of opening of electromagnetic spill valve 152 is smaller, the quantity of the fuel supplied from high-pressure fuel pump 150 into fuel delivery pipe 130 increases. When electromagnetic spill valve 152 is fully open, the fuel supply from high-pressure fuel pump 150 to fuel delivery pipe 130 is stopped. Electromagnetic spill valve 152 is controlled based on an output signal of engine ECU 300.

Each intake manifold injector 120 is connected to a common fuel delivery pipe 160 on a low pressure side. Fuel delivery pipe 160 and high-pressure fuel pump 150 are connected via a common fuel pressure regulator 170 to a low-pressure fuel pump 180 of an electric motor-driven type. Further, low-pressure fuel pump 180 is connected via a fuel filter 190 to a fuel tank 200. Fuel pressure regulator 170 is configured to return a part of the fuel discharged from low-pressure fuel pump 180 back to fuel tank 200 when the pressure of the fuel discharged from low-pressure fuel pump 180 is higher than a preset fuel pressure. This prevents both the pressure of the fuel supplied to intake manifold injector 120 and the pressure of the fuel supplied to high-pressure fuel pump 150 from becoming higher than the above-described preset fuel pressure.

Engine ECU 300 is implemented with a digital computer, and includes a ROM (Read Only Memory) 320, a RAM (Random Access Memory) 330, a CPU (Central Processing Unit) 340, an input port 350, and an output port 360, which are connected to each other via a bidirectional bus 310.

Airflow meter 42 generates an output voltage that is proportional to an intake air quantity, and the output voltage is input via an A/D converter 370 to input port 350. A coolant temperature sensor 380 is attached to engine 10, and generates an output voltage proportional to a coolant temperature of the engine, which is input via an A/D converter 390 to input port 350.

A fuel pressure sensor 400 is attached to fuel delivery pipe 130, and generates an output voltage proportional to a fuel pressure within fuel delivery pipe 130, which is input via an A/D converter 410 to input port 350. An air-fuel ratio sensor 420 is attached to an exhaust manifold 80 located upstream of three-way catalytic converter 90. Air-fuel ratio sensor 420 generates an output voltage proportional to an oxygen concentration within the exhaust gas, which is input via an A/D converter 430 to input port 350.

Air-fuel ratio sensor 420 of the engine system of the present embodiment is a full-range air-fuel ratio sensor (linear air-fuel ratio sensor) that generates an output voltage proportional to the air-fuel ratio of the air-fuel mixture burned in engine 10. As air-fuel ratio sensor 420, an $O_2$ sensor may be employed, which detects, in an on/off manner, whether the air-fuel ratio of the air-fuel mixture burned in engine 10 is rich or lean with respect to a theoretical air-fuel ratio.

Accelerator pedal 100 is connected with an accelerator pedal position sensor 440 that generates an output voltage proportional to the degree of press down of accelerator pedal 100, which is input via an A/D converter 450 to input port 350. Further, an engine speed sensor 460 generating an output pulse representing the engine speed is connected to input port 350. ROM 320 of engine ECU 300 prestores, in the form of a map, values of fuel injection quantity that are set in association with operation states based on the engine load factor and the engine speed obtained by the above-described accelerator pedal position sensor 440 and engine speed sensor 460, and correction values thereof set based on the engine coolant temperature.

Figure 2:
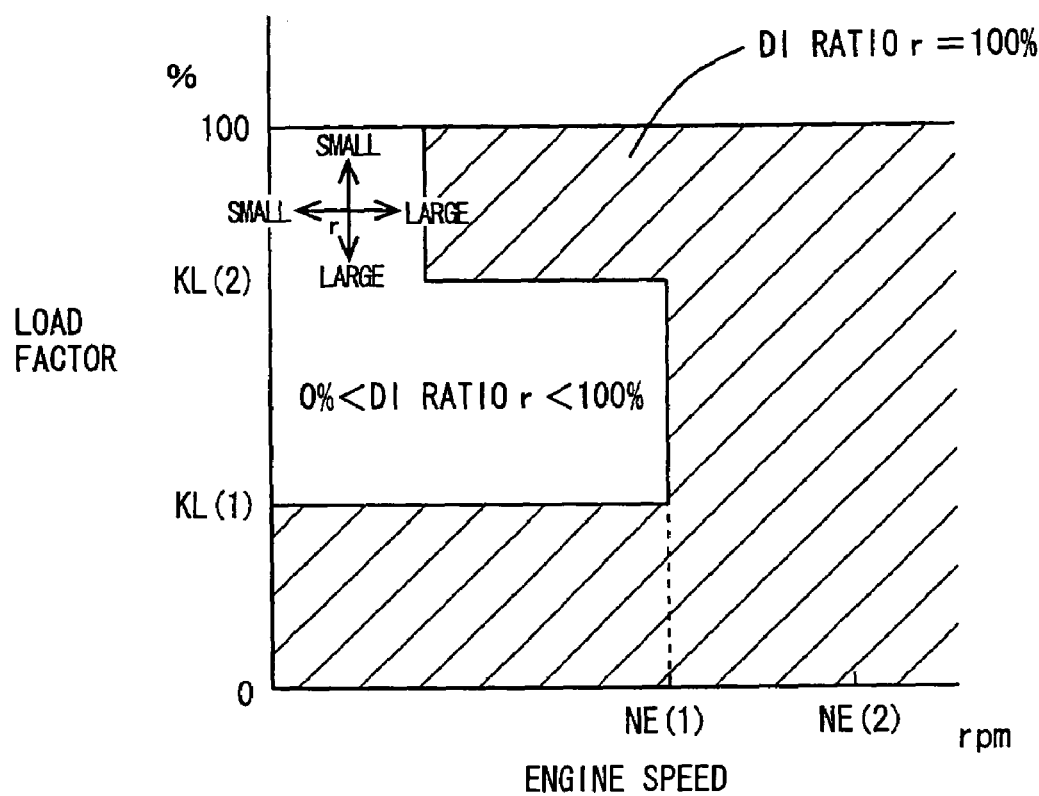
FIG. 2 shows a DI ratio map for a warm state that is stored in an engine ECU implementing the control apparatus according to an embodiment of the present invention.
Figure 3:
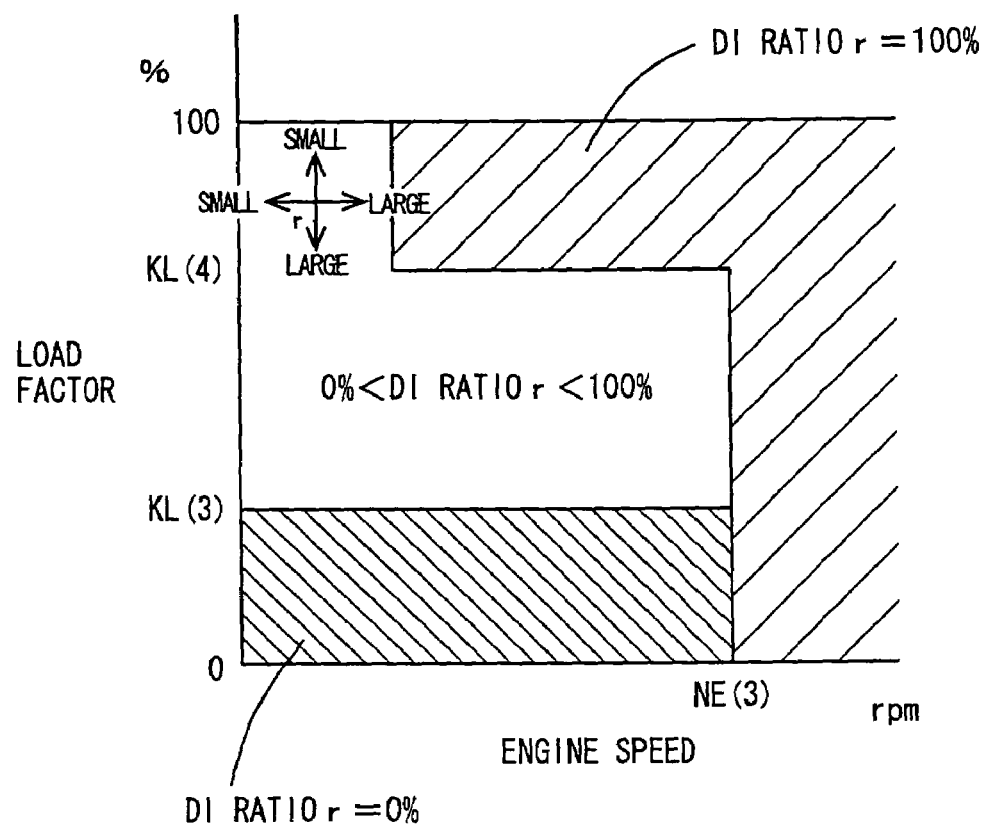
FIG. 3 shows a DI ratio map for a cold state that is stored in the engine ECU implementing the control apparatus according to the embodiment of the present invention.

Referring to FIGS. 2 and 3, maps each indicating a fuel injection ratio between in-cylinder injector 110 and intake manifold injector 120, identified as information associated with an operation state of engine 10, will now be described. Herein, the fuel injection ratio between the two injectors will also be expressed as a ratio of the quantity of the fuel injected from in-cylinder injector 110 to the total quantity of the fuel injected, which is referred to as the "fuel injection ratio of in-cylinder injector 110", or, a "DI (Direct Injection) ratio (r)". The maps are stored in ROM 320 of engine ECU 300. FIG. 2 shows the map for the warm state of engine 10, and FIG. 3 shows the map for the cold state of engine 10.

In the maps shown in FIGS. 2 and 3, with the horizontal axis representing an engine speed of engine 10 and the vertical axis representing a load factor, the fuel injection ratio of in-cylinder injector 110, or the DI ratio r, is expressed in percentage.

As shown in FIGS. 2 and 3, the DI ratio r is set for each operation region that is determined by the engine speed and the load factor of engine 10. "DI RATIO r=100%" represents the region where fuel injection is carried out using only in-cylinder injector 110, and "DI RATIO r=0%" represents the region where fuel injection is carried out using only intake manifold injector 120. "DI RATIO r≠0%", "DI RATIO r≠100%" and "0%<DI RATIO r<100%" each represent the region where fuel injection is carried out using both in-cylinder injector 110 and intake manifold injector 120. Generally, in-cylinder injector 110 contributes to an increase of output performance, while intake manifold injector 120 contributes to uniformity of the air-fuel mixture. These two kinds of injectors having different characteristics are appropriately selected depending on the engine speed and the load factor of engine 10, so that only homogeneous combustion is conducted in the normal operation state of engine 10 (other than the abnormal operation state such as a catalyst warm-up state during idling, for example) (which corresponds to a first invention).

Further, as shown in FIGS. 2 and 3, the fuel injection ratio between in-cylinder injector 110 and intake manifold injector 120 is defined as the DI ratio r, individually in the maps for the warm state and the cold state of the engine. The maps are configured to indicate different control regions of in-cylinder injector 110 and intake manifold injector 120 as the temperature of engine 10 changes. When the temperature of engine 10 detected is equal to or higher than a predetermined temperature threshold value, the map for the warm state shown in FIG. 2 is selected; otherwise, the map for the cold state shown in FIG. 3 is selected. One or both of in-cylinder injector 110 and intake manifold injector 120 are controlled based on the selected map and according to the engine speed and the load factor of engine 10 (which corresponds to a second invention).

The engine speed and the load factor of engine 10 set in FIGS. 2 and 3 will now be described. In FIG. 2, NE(1) is set to 2500 rpm to 2700 rpm, KL(1) is set to 30% to 50%, and KL(2) is set to 60% to 90%. In FIG. 3, NE(3) is set to 2900 rpm to 3100 rpm. That is, NE(1)<NE(3). NE(2) in FIG. 2 as well as KL(3) and KL(4) in FIG. 3 are also set as appropriate.

When comparing FIG. 2 and FIG. 3, NE(3) of the map for the cold state shown in FIG. 3 is greater than NE(1) of the map for the warm state shown in FIG. 2. This shows that, as the temperature of engine 10 is lower, the control region of intake manifold injector 120 is expanded to include the region of higher engine speed (which corresponds to a third invention). That is, when engine 10 is cold, deposits are unlikely to accumulate in the injection hole of in-cylinder injector 110 (even if the fuel is not injected from in-cylinder injector 110). Thus, the region where the fuel injection is to be carried out using intake manifold injector 120 can be expanded, to thereby improve homogeneity.

When comparing FIG. 2 and FIG. 3, "DI RATIO r=100%" holds in the region where the engine speed of engine 10 is equal to or higher than NE(1) in the map for the warm state, and in the region where the engine speed is NE(3) or higher in the map for the cold state. Further, except for the low-speed region, "DI RATIO r=100%" holds in the region where the load factor is KL(2) or greater in the map for the warm state, and in the region where the load factor is KL(4) or greater in the map for the cold state. This means that fuel injection is carried out using only in-cylinder injector 110 in the region where the engine speed is at a predetermined high level, and that fuel injection is often carried out using only in-cylinder injector 110 in the region where the engine load is at a predetermined high level. However, in the low-speed and high-load region, mixing of an air-fuel mixture formed by the fuel injected from in-cylinder injector 110 is poor, and such inhomogeneous air-fuel mixture within the combustion chamber may lead to unstable combustion. Accordingly, the fuel injection ratio of in-cylinder injector 110 is increased as the engine speed increases where such a problem is unlikely to occur (which corresponds to the first invention), whereas the fuel injection ratio of in-cylinder injector 110 is decreased as the engine load increases where such a problem is likely to occur (which corresponds to a fourth invention). These changes in the fuel injection ratio of in-cylinder injector 110, or, the DI ratio r, are shown by crisscross arrows in FIGS. 2 and 3. In this manner, variation in output torque of the engine attributable to the unstable combustion can be suppressed. It is noted that these measures are approximately equivalent to the measures to decrease the fuel injection ratio of in-cylinder injector 110 as the state of the engine moves toward the predetermined low speed region, or to increase the fuel injection ratio of in-cylinder injector 110 as the engine state moves toward the predetermined low load region. Further, except for the relevant region (indicated by the crisscross arrows in FIGS. 2 and 3), in the region where fuel injection is carried out using only in-cylinder injector 110 (on the high speed side and on the low load side), a homogeneous air-fuel mixture is readily obtained even when the fuel injection is carried out using only in-cylinder injector 110. In this case, the fuel injected from in-cylinder injector 110 is atomized within the combustion chamber involving latent heat of vaporization (by absorbing heat from the combustion chamber). Accordingly, the temperature of the air-fuel mixture is decreased at the compression side, and thus, the antiknock performance improves. Further, with the temperature of the combustion chamber decreased, intake efficiency improves, leading to high power output.

In the map for the warm state in FIG. 2, fuel injection is also carried out using only in-cylinder injector 110 when the load factor is KL(1) or less. This shows that in-cylinder injector 110 alone is used in a predetermined low load region when the temperature of engine 10 is high (which corresponds to a six invention). When engine 10 is in the warm state, deposits are likely to accumulate in the injection hole of in-cylinder injector 110. However, when fuel injection is carried out using in-cylinder injector 110, the temperature of the injection hole can be lowered, whereby accumulation of deposits is prevented. Further, clogging of in-cylinder injector 110 may be prevented while ensuring a minimum fuel injection quantity thereof. Thus, in-cylinder injector 110 alone is used in the relevant region.

When comparing FIG. 2 and FIG. 3, there is a region of "DI RATIO r=0%" only in the map for the cold state in FIG. 3. This shows that fuel injection is carried out using only intake manifold injector 120 in a predetermined low load region (KL(3) or less) when the temperature of engine 10 is low (which corresponds to a seventh invention). When engine 10 is cold and low in load and the intake air quantity is small, atomization of the fuel is unlikely to occur. In such a region, it is difficult to ensure favorable combustion with the fuel injection from in-cylinder injector 110. Further, particularly in the low-load and low-speed region, high power output using in-cylinder injector 110 is unnecessary. Accordingly, fuel injection is carried out using intake manifold injector 120 alone, rather than using in-cylinder injector 110, in the relevant region.

Further, in an operation other than the normal operation, i.e., in the catalyst warm-up state at idle of engine 10 (abnormal operation state), in-cylinder injector 110 is controlled to carry out stratified charge combustion (which corresponds to a fifth invention). By causing the stratified charge combustion during the catalyst warm-up operation, warming up of the catalyst is promoted, and exhaust emission is thus improved.

In engine 10, homogeneous combustion is achieved by setting the fuel injection timing of in-cylinder injector 110 in the intake stroke, while stratified charge combustion is achieved by setting it in the compression stroke. That is, when the fuel injection timing of in-cylinder injector 110 is set in the compression stroke, a rich air-fuel mixture can be located locally around the spark plug, so that a lean air-fuel mixture in the combustion chamber as a whole is ignited to realize the stratified charge combustion. Even if the fuel injection timing of in-cylinder injector 110 is set in the intake stroke, stratified charge combustion can be realized if it is possible to locate a rich air-fuel mixture locally around the spark plug.

As used herein, the stratified charge combustion includes both the stratified charge combustion and semi-stratified charge combustion. In the semi-stratified charge combustion, intake manifold injector 120 injects fuel in the intake stroke to generate a lean and homogeneous air-fuel mixture in the whole combustion chamber, and then in-cylinder injector 10 injects fuel in the compression stroke to generate a rich air-fuel mixture around the spark plug, so as to improve the combustion state. Such semi-stratified charge combustion is preferable in the catalyst warm-up operation for the following reasons. In the catalyst warm-up operation, it is necessary to considerably retard the ignition timing and maintain favorable combustion state (idling state) so as to cause a high-temperature combustion gas to reach the catalyst. Further, a certain quantity of fuel needs to be supplied. If the stratified charge combustion is employed to satisfy these requirements, the quantity of the fuel will be insufficient. With the homogeneous combustion, the retarded amount for the purpose of maintaining favorable combustion is small compared to the case of stratified charge combustion. For these reasons, the above-described semi-stratified charge combustion is preferably employed in the catalyst warm-up operation, although either of stratified charge combustion and semi-stratified charge combustion may be employed.

Figure 4:
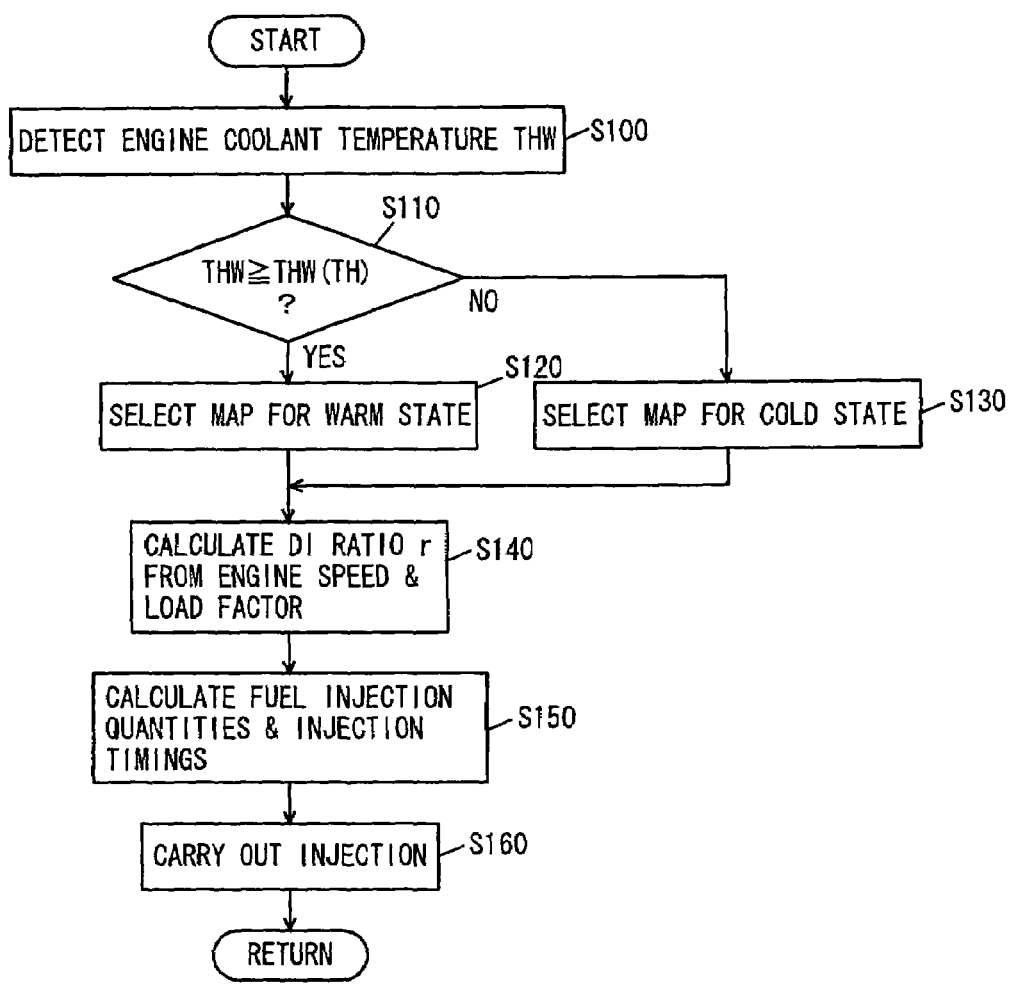
FIG. 4 is a flowchart illustrating a control structure of a program that is executed by the engine ECU implementing the control apparatus according to the embodiment of the present invention.

Referring to FIG. 4, a control structure of a program that is executed by engine ECU 300 implementing the control apparatus according to an embodiment of the present invention will be described.

In step (hereinafter, abbreviated as "S") 100, engine ECU 300 detects an engine coolant temperature THW based on data input from coolant temperature sensor 380. In S110, engine ECU 300 determines whether the detected engine coolant temperature THW is equal to or higher than a predetermined temperature threshold value THW(TH), which may be set to 70° C. to 90° C., for example. If engine coolant temperature THW is equal to or higher than temperature threshold value THW(TH) (YES in S110), the process goes to S120. If not (NO in S110), the process goes to S130.

In S120, engine ECU 300 selects the map for the warm state (FIG. 2).

In S130, engine ECU 300 selects the map for the cold state (FIG. 3).

In S140, engine ECU 300 calculates DI ratio r from the engine speed and the load factor of engine 10, based on the selected map. The engine speed of engine 10 is calculated based on the data input from engine speed sensor 460, and the load factor is calculated based on the data input from accelerator pedal position sensor 440 as well as the running state of the vehicle.

In S150, engine ECU 300 calculates the fuel injection quantity and the injection timing of in-cylinder injector 110 if DI ratio r=100%, calculates the fuel injection quantity and the injection timing of intake manifold injector 120 if DI ratio r=0%, or calculates the fuel injection quantities and the injection timings of in-cylinder injector 110 and intake manifold injector 120 if DI ratio r≠0% or DI ratio r≠100% (0%<DI ratio r<100%).

In S160, engine ECU 300 controls in-cylinder injector 110 and intake manifold injector 120 based on the fuel injection quantity(ies) and the injection timing(s) calculated, to effect the fuel injection.

An operation of engine 10 controlled by engine ECU 300 implementing the control apparatus for an internal combustion engine of the present embodiment based on the above-described structure and flowchart will now be described.

[At Engine Start]

For example, immediately after start-up of engine 10 where engine 10 is cold, engine ECU 300 controls engine 10 assuming that it is in the abnormal operation state that does not correspond to any of FIGS. 2-4. In this state, the catalyst is inactive, and emission of the exhaust gas into the atmosphere should be avoided. Thus, the engine enters a stratified charge combustion mode, and the fuel is injected from in-cylinder injector 110 to realize stratified charge combustion. The stratified charge combustion in this case lasts for from some seconds to some tens of seconds.

It is noted that the stratified charge combustion herein includes both the stratified charge combustion and the semi-stratified charge combustion, as described above.

[In Cold State of Engine]

The temperature of engine 10 increases after start-up thereof. The map for the cold state (FIG. 3) is selected until the temperature of engine 10 (engine coolant temperature THW) reaches a predetermined temperature threshold value (of 80° C., for example) (NO in S110).

The fuel injection ratio of in-cylinder injector 100, i.e., DI ratio r, is calculated based on the selected map for the cold state (FIG. 3) and the engine speed and the load factor of engine 10. The DI ratio r obtained is used to calculate the fuel injection quantity(ies) and the injection timing(s) (S150), and based thereon, in-cylinder injector 110 and intake manifold injector 120 are controlled to carry out the fuel injection. In this state, homogeneous combustion is effected in any region shown in FIG. 3.

[In Warm State of Engine]

With a further increase, when temperature of engine 10 (engine coolant temperature THW) becomes equal to or higher than the predetermined temperature threshold value (of 80° C., for example) (YES in S110), the map for the warm state (FIG. 2) is selected.

The fuel injection ratio of in-cylinder injector 110, i.e., DI ratio r, is calculated based on the selected map for the warm state (FIG. 2) and the engine speed and the load factor of engine 10. Based on the calculated DI ratio r, the fuel injection quantity(ies) and the injection timing(s) are calculated (S150), and based thereon, in-cylinder injector 110 and intake manifold injector 120 are controlled to carry out the fuel injection. In this state, homogeneous combustion is effected in any region shown in FIG. 2.

As described above, in the engine controlled by the engine ECU of the present embodiment, when the fuel injection is being carried out using both the in-cylinder injector and the intake manifold injector, the fuel injection ratio therebetween is controlled based on the maps that are separately prepared, e.g., for the warm state and the cold state of the internal combustion engine and are set according to the engine speed and the load factor of the engine. At this time, the control of the fuel injection ratio is carried out based on the maps such that homogeneous combustion is realized over the entire region. Accordingly, the conventional problem associated with control of switching between the stratified charge combustion and the homogeneous combustion, as well as the conventional problem associated with control of the homogeneous combustion in the case of a direct injection engine, can be solved.

Note that preferably in-cylinder injector 110 is timed to inject fuel at the compression stroke for the following reason, although in engine 10 described above, the fuel injection timing of in-cylinder injector 110 is set in the intake stroke in a basic region corresponding to the almost entire region (herein, the basic region refers to the region other than the region where semi-stratified charge combustion is conducted by causing intake manifold injector 120 to inject the fuel in the intake stroke and causing in-cylinder injector 110 to inject the fuel in the compression stroke, which is conducted only in the catalyst warm-up state). The fuel injection timing of in-cylinder injector 110, however, may be set temporarily in the compression stroke for the purpose of stabilizing combustion, for the following reasons.

When the fuel injection timing of in-cylinder injector 110 is set in the compression stroke, the air-fuel mixture is cooled by the injected fuel while the temperature in the cylinder is relatively high. This improves the cooling effect and, hence, the antiknock performance. Further, when the fuel injection timing of in-cylinder injector 110 is set in the compression stroke, the time from the fuel injection to the ignition is short, which ensures strong penetration of the injected fuel, so that the combustion rate increases. The improvement in antiknock performance and the increase in combustion rate can prevent variation in combustion, and thus, combustion stability is improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control apparatus for an internal combustion engine having a first fuel injection mechanism for injecting a fuel into a cylinder and a second fuel injection mechanism for injecting a fuel into an intake manifold, comprising:
   a determination unit for determining whether said internal combustion engine is in a normal operation state; and
   a control unit for controlling said first and second fuel injection mechanisms, based on information associated with an operation state of said internal combustion engine, such that homogeneous combustion solely is carried out when it is determined that said internal combustion engine is in said normal operation state, wherein
   said information is information that said first fuel injection mechanism has a fuel injection ratio increased as an engine speed shifts to a predetermined high range.

2. The control apparatus for an internal combustion engine according to claim 1, wherein said information is set such that control regions of said first and second fuel injection mechanisms change as a temperature of said internal combustion engine changes,
   the control apparatus further comprising:
   a detection unit for detecting the temperature of said internal combustion engine,
   said control unit controlling the fuel injection mechanisms based on said detected temperature and said information.

3. The control apparatus for an internal combustion engine according to claim 1, wherein said information is set such that a control region of said second fuel injection mechanism is expanded to include a region of higher engine speed as a temperature of said internal combustion engine is lower.

4. The control apparatus for an internal combustion engine according to claim 1, wherein said information is information that said first fuel injection mechanism has a fuel injection ratio decreased as an engine load shifts to a predetermined high range.

5. The control apparatus for an internal combustion engine according to claim 1, wherein
said determination unit determines that said internal combustion engine is in an abnormal operation state during a catalyst warm-up operation upon idling, and
said control unit further includes an abnormal operation state controller controlling said first fuel injection mechanism to carry out stratified charge combustion in said abnormal operation state.

6. The control apparatus for an internal combustion engine according to claim 1, wherein said information is set such that said first fuel injection mechanism alone is used in a predetermined, low engine load region when a temperature of said internal combustion engine is high.

7. The control apparatus for an internal combustion engine according to claim 1, wherein said information is set such that said second fuel injection mechanism alone is used in a predetermined, low engine load region when a temperature of said internal combustion engine is low.

8. The control apparatus for an internal combustion engine according to claim 1, wherein said information includes information indicating a fuel injection ratio between said first and second fuel injection mechanisms that is defined by an engine speed and a load factor of said internal combustion engine.

9. The control apparatus for an internal combustion engine according to claim 1, wherein
said first fuel injection mechanism is an in-cylinder injector, and
said second fuel injection mechanism is an intake manifold injector.

10. A control apparatus for an internal combustion engine having first fuel injection means for injecting a fuel into a cylinder and second fuel injection means for injecting a fuel into an intake manifold, comprising:
determination means for determining whether said internal combustion engine is in a normal operation state; and
control means for controlling said first and second fuel injection means, based on information associated with an operation state of said internal combustion engine, such that homogeneous combustion solely is carried out when it is determined that said internal combustion engine is in said normal operation state, wherein
said information is information that said first fuel injection means has a fuel injection ratio increased as an engine speed shifts to a predetermined high range.

11. The control apparatus for an internal combustion engine according to claim 10, wherein said information is set such that control regions of said first and second fuel injection means change as a temperature of said internal combustion engine changes,
the control apparatus further comprising:
detection means for detecting the temperature of said internal combustion engine,
said control means including means for controlling the fuel injection means based on said detected temperature and said information.

12. The control apparatus for an internal combustion engine according to claim 10, wherein said information is set such that a control region of said second fuel injection means is expanded to include a region of higher engine speed as a temperature of said internal combustion engine is lower.

13. The control apparatus for an internal combustion engine according to claim 10, wherein said information is information that said first fuel injection means has a fuel injection ratio decreased as an engine load shifts to a predetermined high range.

14. The control apparatus for an internal combustion engine according to claim 10, wherein
said determination means includes means for determining that said internal combustion engine is in an abnormal operation state during a catalyst warm-up operation upon idling, and
said control means further includes means for controlling said first fuel injection means to carry out stratified charge combustion in said abnormal operation state.

15. The control apparatus for an internal combustion engine according to claim 10, wherein said information is set such that said first fuel injection means alone is used in a predetermined, low engine load region when a temperature of said internal combustion engine is high.

16. The control apparatus for an internal combustion engine according to claim 10, wherein said information is set such that said second fuel injection means alone is used in a predetermined, low engine load region when a temperature of said internal combustion engine is low.

17. The control apparatus for an internal combustion engine according to claim 10, wherein said information includes information indicating a fuel injection ratio between said first and second fuel injection means that is defined by an engine speed and a load factor of said internal combustion engine.

18. The control apparatus for an internal combustion engine according to claim 10, wherein
said first fuel injection means is an in-cylinder injector, and
said second fuel injection means is an intake manifold injector.

* * * * *